United States Patent [19]

Harada

[11] Patent Number: 4,711,662

[45] Date of Patent: Dec. 8, 1987

[54] PROCESS FOR THE SIMULTANEOUS TREATMENT OF DUST, SLUDGE AND STEEL SLAG

[75] Inventor: Akihisa Harada, Kitakyushu, Japan

[73] Assignee: Nippon Jiryoku Senko Co., Ltd., Fukuoka, Japan

[21] Appl. No.: 918,192

[22] Filed: Oct. 14, 1986

[30] Foreign Application Priority Data

Jun. 11, 1986 [JP] Japan .................. 61-136721

[51] Int. Cl.$^4$ ............................................. C22B 1/00
[52] U.S. Cl. ............................................ 75/1 R; 75/3; 75/24; 75/25
[58] Field of Search ............ 75/24, 25, 1, 3-5

[56] References Cited

U.S. PATENT DOCUMENTS

| | | | |
|---|---|---|---|
| 3,169,054 | 2/1965 | Werner | 75/25 |
| 3,326,670 | 6/1967 | Bratton | 75/25 |
| 3,756,804 | 9/1973 | Stevenson | 75/25 |
| 4,102,675 | 7/1978 | Miyashita | 75/24 |
| 4,110,107 | 8/1978 | Paulson | 75/24 |
| 4,396,423 | 8/1983 | Stephens | 75/25 |
| 4,612,041 | 9/1986 | Matsuoka | 75/25 |

*Primary Examiner*—Peter D. Rosenberg
*Attorney, Agent, or Firm*—Armstrong, Nikaido, Marmelstein & Kubovcik

[57] ABSTRACT

The present invention relates to a process for the simultaneous treatment of dust, sludge and steel slag generated in the steel-manufacturing step, characterized by using a specified amount of a silicate mineral containing water of crystallization as a modifier. This process comprises adding a silicate mineral containing water of crystallizaiton to molten steel slag having a high temperature to carry out the modification of the slag, while stirring the slag by the gas generated by the decomposition of the silicate mineral containing water of crystallization, According to the process, dust, sludge and steel slag can be treated simultaneously to give an innoxious material which can be utilized satisfactorily.

10 Claims, 2 Drawing Figures

PROCESS FOR THE SIMULTANEOUS TREATMENT OF DUST, SLUDGE AND STEEL SLAG

BACKGROUND OF THE INVENTION

1. Field of the Invention

The present invention relates to a process for the simultaneous treatment of dust, sludge and steel slag which are generated in an ironworks, characterized by adding dust and sludge to a molten steel slag generated in the steel-manufacturing step.

2. Description of the Prior Art

Dust or sludge generated in the steel-manufacturing step in an ironworks generally contains not only iron oxide as a main component but also Zn, Pb, Cd, Cr, Ni, Cu, Mn and the like to some extent, so that the disposal thereof as an industrial waste is difficult and costs a great deal.

On the other hand, the study on the utilization as resources of steel slag generated in the steel-manufacturing step (that is, in a convertor or electric furnace) in an ironworks has been developed. However, not all of such slag has been utilized and a part thereof has been discarded as a waste, because such slag causes expansion and disintegration due to free lime, $2CaO \cdot SiO_2$ and the like.

Therefore, steel slag has been modified so as not to cause expansion and disintegration. For example, a process which comprises adding one or more of modifiers such as red mud, some kind of slag, decomposed granite or slate into a molten steel slag in a proper amount to thereby modify the slag has been carried out.

However, these modifiers can not be easily mixed with molten steel slag merely by adding. Therefore, a process which comprises blowing a bubbling gas via a lance pipe into molten steel slag to circulate the slag by convention, thereby modifying the slag has also been carried out.

This process has a disadvantage in that a lance pipe for blowing a bubbling gas into molten steel slag and a means for supporting the pipe are needed.

Further, a lance pipe inserted into molten steel slag must be properly repaired or exchanged, because the inserted part of the pipe is corroded by the molten steel slag. Consequently, the above process has also other disadvantage in that additional labor and additional equipment for the repair or exchange are required.

Furthermore, the process has another disadvantage in that molten steel slag is cooled by blowing a low-temperature bubbling gas into the slag, so that the fluidity of the molten steel slag is lowered to result in insufficient modification reaction, because the reaction is endothermic.

SUMMARY OF THE INVENTION

The present invention has been made in view of the above circumstance. The first object of the present invention is to accelerate the reaction of molten steel slag with a modifier, dust and sludge without blowing a bubbling gas into the molten steel slag to recover metals contained in the dust, sludge and steel slag.

The second object of the present invention is to enable a satisfactory reuse of the steel slag remaining after the recovery of metals by converting noxious metals contained in dust and sludge into innoxious ones.

The process for the simultaneous treatment of dust, sludge and steel slag according to the first invention having the above objects comprises the first step of adding 5 to 20% by weight of a reducing agent to dust and sludge generated in the steel-manufacturing step, followed by kneading, the second step of converting the mixture kneaded in the first step into a lump having a particle size of 5 to 80 mm with a lumping device, the third step of adding the lump prepared in the second step and 5 to 20% by weight (based on the amount of molten steel slag to be treated) of a silicate mineral containing water of crystallization to molten steel slag to carry out the modification of the slag with bubbling due to the decomposition of the silicate mineral containing water of crystallization and the fourth step of cooling the steel slag treated in the third step to recover a metal component by an ordinary mineral dressing method.

Further, the process for the simultaneous treatment of dust, sludge and steel slag according to the second invention having the above objects comprises the first step of adding 5 to 20% by weight of a reducing agent and 5 to 20% by weight (based on the amount of molten steel slag to be treated) of a silicate mineral containing water of crystallization to dust and sludge generated in the steel-manufacturing step, followed by kneading, the second step of converting the mixture kneaded in the first step into a lump having a particle size of 5 to 80 mm with a lumping device, the third step of adding the lump prepared in the second step to molten steel slag to carry out the modification of the slag with bubbling due to the decomposition of the silicate mineral containing water of crystallization and the fourth step of cooling the steel slag treated in the third step to recover a metal component by an ordinary mineral dressing method.

The silicate mineral containing water of crystallization to be used in the process according to the first or second invention may be any one (including rocks) containing water of crystallization in its inside which can be decomposed by mixing with molten steel slag to gasify the water. Examples of the silicate mineral include obsidian, perlite, pitch stone, mixture thereof and mixtures of a mineral containing water of crystallization with a silicate mineral.

Further, it is preferred in the third step of the process according to the first invention that the lump and, if necessary, the silicate mineral containing water of crystallization are suitably preheated and added to molten steel slag. Similarly, it is preferred in the process according to the second invention that the lump prepared in the second step is preheated to a proper temperature and added to molten steel slag.

Furthermore, in the third step of any of the processes of the first and second inventions, the Pb and Zn contained in the dust and sludge are evaporated by adding the lump to molten steel slag to enter into the off-gas. It is preferred that the Pb and Zn which have been evaporated and converted into oxides are receovered with a dust collector of a filter cloth type provided in the passageway of the off-gas.

As described above, in any of the processes according to the first and second inventions, when a silicate mineral containing water of crystallization is added to molten steel slag, the mineral is decomposed by the heat of the slag to generate a gas and the slag is stirred by the gas, so that no bubbling is required.

Further, free CaO, free MgO, $2CaO \cdot SiO_2$ and $3CaO \cdot 2SiO_2$ which are contained in a steel slag and are major causes for expantion and disintegration are converted by throwing a silicate mineral containing water of crystallization into the molten steel slag into compounds which are stable enough to be used as materials for civil engineering works, for example, $CaO \cdot SiO_2$, $2CaO \cdot Al_2O_3 \cdot SiO_2$, $2CaO \cdot MgO \cdot 2SiO_2$, $2CaO \cdot Fe_2O_3$, $4CaO \cdot Al_2O_3 \cdot Fe_2O_3$ or the like. Furthermore, noxious metals contained in dust and sludge enter into the crystalline structure of the steel slag after the cooling to replace a part of the structure. Alternatively, they are set in the glassy part of the slag. Therefore, they will become non-leachable.

Furthermore, easily evaporable metals contained in dust and sludge, such as Pb or Zn, can be collected with a dust collector of filtration type and be reused and a metal contained in dust, sludge and steel slag can be recovered and utilized as materials for steel.

DETAILED DESCRIPTION OF PREFERRED EMBODIMENTS

Figure 1:
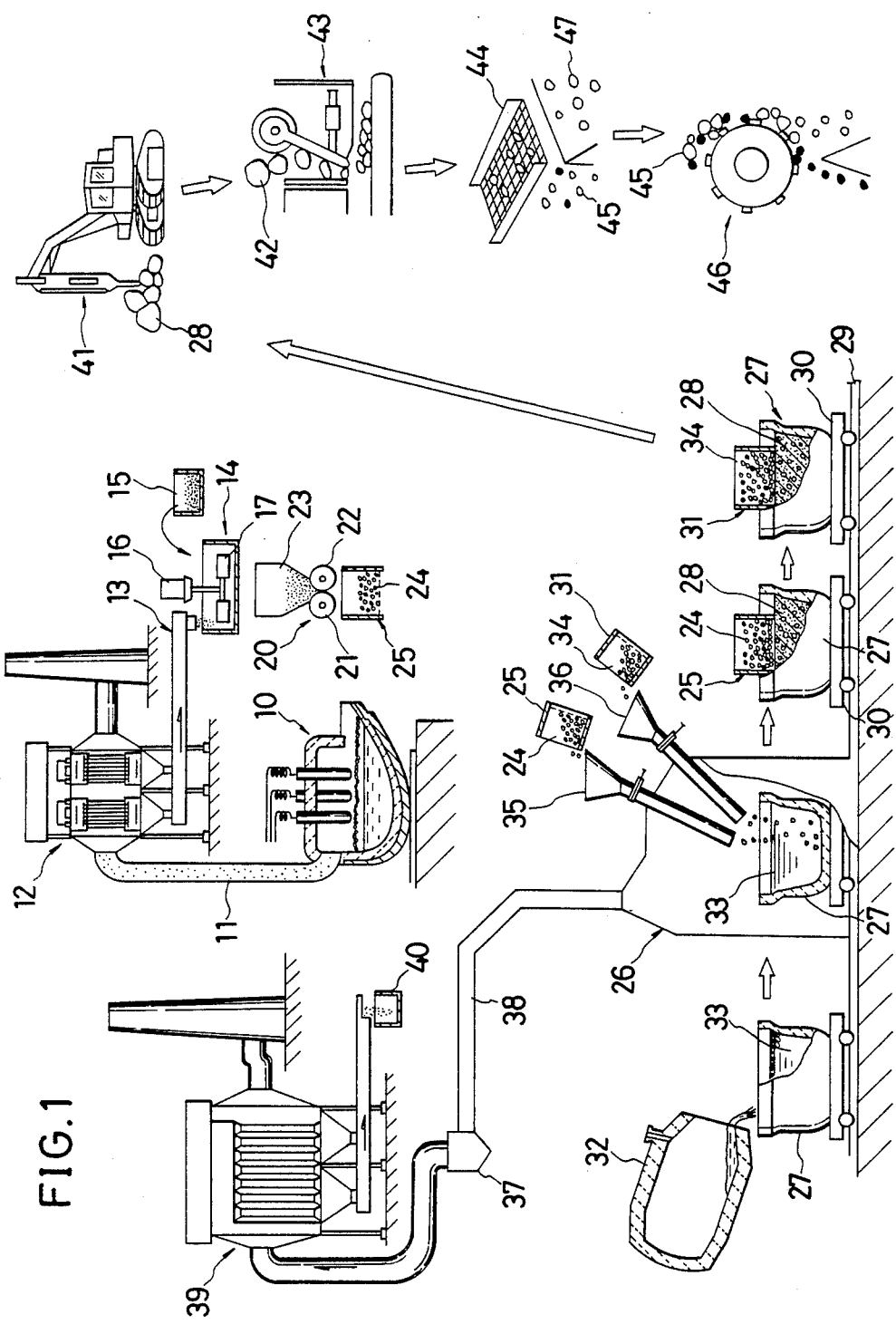
FIG. 1 is a flow chart showing a representative example of the process for simultaneously treating dust, sludge and steel slag according to the first invention.

Am example of the process for the simultaneous treatment of dust, sludge and steel slag according to the first invention will now be described.

Dust and sludge 11 generated in an electric furnace 10, which are an example of dust and sludge, are collected with a dust collector 12, transferred with a screw conveyor 13 and thrown into a mixer 14 in a given amount.

Although a bag filter which is a dry dust collector is shown as the collector 12 in this example, the above dust and sludge generated in the electric furnace can also be collected with a wet dust collector or with a combination of a dry collector and a wet one. Although dust and sludge generated in an electric furnace are used in this example, the present invention can be applied to dust and sludge generated in a convertor or an open hearth furnace.

The compositions with respect to the above dust and sludge 11 from an electric furnace, those from a convertor and those from an open hearth furnace are shown in Table 1.

TABLE 1

| | (weight %) | | | | | | | | |
|---|---|---|---|---|---|---|---|---|---|
| | Ig. loss | $SiO_2$ | $Al_2O_3$ | T.Fe | CaO | MgO | MnO | Zn | Pb |
| A | 3.9 | 3.3 | 0.9 | 32.4 | 2.2 | 1.2 | 2.5 | 15.5 | 2.5 |
| B | 5.7 | 1.7 | 0.1 | 64.0 | 2.0 | 0.2 | 1.5 | 0.08 | 0.06 | wherein A is an electric furnace dust and B is a convertor dust.

Coke powder 15 serving as a reducing agent is added to the mixer 14 in an amount of 5 to 20% by weight based on the dust and sludge 11. The dust and sludge 11 are kneaded with the coke powder 15 by rotating a blade 17 by a motor 16 (first step).

The mixture kneaded in the above step is converted into a lump having a particle size of 5 to 80 mm with a lumping device 20. This lumping device 20 is a known device and comprises two revolving rollers 21 and 22 which are provided in contact with each other and have holes formed face to face and having a specified size. The material fed from the hopper 23 is converted into a lump (second step).

The lump 24 prepared with the lumping device 20 is thrown into a container 25 having a lattice bottom of a specified interval, transferred with a transfer means not shown in the figure (for example, a crane), placed on a slag pan 27 from a treatment room 26 which will be described. The lump 24 is preheated with a steel slag 28 which has been solidified and is being cooled. This slag pan 27 is set on a truck 30 moving on a rail 29 connected to the treatment room 26 wherein dust, sludge and steel slag are treated simultaneously.

Although this truck 30 will moves on the rail 29 toward the right shown in the FIG. 1, a container 31 having the same structure as the one of the above container 25 is placed on the steel slag 28 which has been solidified and is behind cooled at this position. This container 31 contains 5 to 20% by weight (based on molten slag 33 discharged from a convertor 32) of perlite 34 (which is an example of silicate mineral containing water of crystallization and can be replaced with obsidian, pitch stone or a mixture thereof) therein. This perlite 34 is crushed into a particle size of about 20 to 80 mm so as not to pass through the lattice bottom of the container 31.

An example of the compositions of the above obsidian, perlite and pitch stone is shown in Table 2.

TABLE 2

| | (weight %) | | | | | | | |
|---|---|---|---|---|---|---|---|---|
| | $+H_2O$ | $SiO_2$ | $Al_2O_3$ | T.Fe | CaO | MgO | MnO | $Na_2O$ | $K_2O$ |
| D | 3.7 | 73.4 | 12.3 | 1.2 | 0.5 | 0.4 | — | 2.9 | 5.3 |
| E | 0.5 | 73.8 | 13.0 | 1.8 | 0.4 | 0.2 | — | 3.8 | 3.9 |
| F | 6.5 | 70.2 | 12.3 | 1.5 | 0.4 | 0.3 | — | 3.0 | 3.6 | wherein D: the perlite,
E: the obsidian,
F: the pitch stone.

On the other hand, the molten steel slag 33 discharged from the convertor 32 which is an exemplary furnace for manufacturing steel is placed in the slag pan 27 and transferred toward the treatment room 26. Although a molten steel slag discharged from a convertor is used in this example, the present invention can also be applied to reduction- or oxidation-stage slag discharged from an electric furnace or any steel slag discharged from other treatment furnaces. The compositions of these slags are shown in Table 3.

TABLE 3

| | (weight %) | | | | | | | |
|---|---|---|---|---|---|---|---|---|
| | Ig. loss | $SiO_2$ | $Al_2O_3$ | T.Fe | CaO | MgO | MnO | $Na_2O$ | $K_2O$ |
| G | +1.7 | 12.5 | 1.2 | 17.9 | 39.8 | 6.4 | 5.2 | 0.2 | 0.01 |
| H | 1.9 | 27.6 | 3.2 | 0.9 | 57.8 | 6.0 | 0.7 | 0.2 | 0.1 |
| I | +3.5 | 12.2 | 4.0 | 30.1 | 24.3 | 6.7 | 4.5 | 0.2 | 0.01 | wherein G: convertor slag,
H: reduction-stage slag,
I: oxidation-stage slag

The above treatment room 26 is provided with inlets 35 and 36 for feeding materials into the slag pan 27 in its upper part. The lump 24 and the perlite 34 which have been placed in the containers 25 and 31, respectively, and each preheated are thrown into the room 26 from the inlets 35 and 36, respectively.

When the lump 24 and the perlite 34 are thrown into molten steel slag 34, the Pb, Zn, and the like contained in the lump 24 are evaporated, converted into oxides and discharged outward together with an off-gas. These oxides are passed through an off-gas duct 38 fitted with a trap 37 in the way, collected by a dust collector of filtration type 39, placed in a container 40 and reused as a metal source. The amount of the lump 24 must be in such a range as to keep the molten steel slag 33 at a temperature above its melting point, when the lump 24 is added to the slag 33. Generally, the amount is at most 20% by weight based on the molten steel slag 33.

Although the lump 24 and the perlite 34 are thrown into the molten steel slag 33 to carry out the mixing in this example, the mixing may be carried out by throwing molten steel slag into the lump and perlite which have been beforehand placed in the slag pan 27.

While the lump 24 and perlite 34 thrown into the molten steel slag 33 are falling through the slag 33, the water of crystallization contained in the perlite 34 is evaporated into vapor to stir the molten steel slag and the dust and sludge contained in the lump 24 are reacted with the slag 33. Further, the molten steel slag 33 is wholly modified by the reaction with the water-free perlite to thereby lower the melting point of the slag 33, so that the molten steel slag 33 will not be easily solidified even when mixed with dust and sludge having a low temperature. After the completion of the modification, the molten steel slag 33 is solidified with the lapse of time. The slag pan 27 containing the solidified steel slag 28 therein moves on the rail 29 to go out of the treatment room 26. This solidified slag 28 has still a high temperature, so that it can be used as a heat source for preheating the lump 24 and the perlite 34 as described above (third step).

The steel slag 28 modified in the above step is subjected to ordinary mineral dressing to recover metals. The mineral dressing will now be described in more detail.

The steel slag 28 is spalled with a breaker 41 driven by ordinary hydraulic equipment. The spalled steel slag 42 is primarily crushed with a jaw crusher 43 and passed through a screen 44 to obtain a slag 45 having a particle size smaller than a specified value. Metals are recovered from the slag 45 by a magnetic separator 46 and can be reused as a material for steel. The separated slag can be used as a material for civil engineering works.

On the other hand, a steel slag 47 which has not been passed through the screen 44 and has a particle size larger than the specified value is again crushed with the jaw crusher 43. Although the magnetic separator 46 is used to recover metals in this example, a metal component having a high specific gravity can also be recovered by a gravitational separator (fourth step).

The result of the chemical analysis of the above prepared slag is shown in Table 4, while the result of the leaching test thereof is shown in Table 5.

TABLE 4

| | (weight %) | | | | | | | |
|---|---|---|---|---|---|---|---|---|
| Ig. loss | $SiO_2$ | $Al_2O_3$ | T.Fe | CaO | MgO | MnO | $Na_2O$ | $K_2O$ |
| J — | 16.7 | 2.2 | 22.2 | $32^6$ | 0.7 | — | 0.4 | 0.3 | wherein J: modified convertor slag

TABLE 5

| | (mg/l) | | | | | | |
|---|---|---|---|---|---|---|---|
| | Cd | Pb | Zn | As | $Cr^{6+}$ | T.Hg | CN |
| J | ND | ND | ND | ND | ND | ND | ND | wherein J: modified convertor slag
(Leaching test according to the notification of the Environment Agency)

It can be understood from the result shown in Table 5 that the noxious metals which were contained in the dust and sludge are almost entirely set in the modified slag. Consequently, the finally obtained slag can be satisfactorily used as a material for civil engineering works.

Now an example of the process according to the second invention will be described, while referring to FIG. 2 wherein the same elements as the ones used in the FIG. 1 are numbered by using the same numerals as the ones used in the FIG. 1 to omit detailed description of such elements.

Dust and sludge 11 discharged from an electric furnace 10 are collected with a dust collector 12 and thrown into a mixer 14. 5 to 20% by weight (based on the amount of the dust and sludge 11) of coke powder 49 serving as a reducing agent and 5 to 20% by weight (based on the amount of the molten steel slag 50 which will be described) of a mixture 51 of perlite and pitch stone (which is an example of silicate mineral containing water of crystallization and can be replaced by obsidian) are thrown into the mixer 14, followed by kneading. This mixture 51 is preferably powdery or granular. Further, if necessary, a binder such as cement may be added to the mixture 51. Although the amount of the above dust and sludge containing 5 to 20% by weight of the reducing agent is varied depending upon the preheating temperature and the like, it must be in such a range as to keep the molten steel slag 50 at a temperature above its melting point when the dust and sludge containing the reducing agent are thrown into the slag 50. Particularly, it is preferably at most 20% by weight based on the molten steel slag 50.

The mixture kneaded with the mixer 14 is converted into a lump having a particle size of 5 to 80 mm with a lumping device 20 and thrown into a container 25. The lump 52 thrown into the container 25 is placed on a slag pan 54 coming from a treatment room 53 and preheated with the heat of a steel slag 55 which is placed in this slag pan 54 and is being solidified and cooled.

On the other hand, the molten steel metal 50 discharged from the electric furnace 10, which is an example of the furnace for manufacturing steel, is thrown into a slag pan 54 and transferred by a truck 30 into a treatment room 53 which is closed to a certain extent. The above preheated lump 52 is thrown into the pan 54 from an inlet 56 provided at the top of the room 53.

While the lump 52 is falling down through the molten steel slag 50, the mixture 51 of perlite and pitch stone is heated to lose the water of crystallization and the water is converted into vapor to stir the molten steel slag 50. Thereby, Pb, Zn and the like contained in the lump are evaporated and collected by the above dust collector of filtration type 39.

On the other hand, the molten steel slag 50 is modified with the mixture 51 of perlite and pitch stone which is contained in the lump and is free from water of crystallization.

The slag pan 54 after the above modification is placed in the truck 30 and goes out of the treatment room 53.

The molten steel slag 50 placed in the pan 54 is solidified into a steel slag 55 and used as a heat source for preheating the lump 52 as described above.

The steel slag 55 is completely cooled and divided into a slag and metals by the above ordinary mineral dressing method. The recovered metals can be reused as a material for steel, while the slag can be utilized as a material for civil engineering works.

The result of the chemical analysis of the above prepared slag is shown in Table 6, while the result of the leaching test thereof is shown in Table 7.

TABLE 6

| | (weight %) | | | | | | | |
|---|---|---|---|---|---|---|---|---|
| | Ig. loss | $SiO_2$ | $Al_2O_3$ | T.Fe | CaO | MgO | MnO | $Na_2O$ | $K_2O$ |
| K | — | 36.7 | 5.1 | 13.7 | 47.5 | 5.3 | — | 0.5 | 0.8 | wherein K: modified electric furnace slag (reduction stage)

TABLE 7

| | (ppm) | | | | | | |
|---|---|---|---|---|---|---|---|
| | Cd | Pb | Zn | As | $Cr^{6+}$ | T.Hg | CN |
| K | ND | ND | ND | ND | ND | ND | ND | wherein K: modified electric furnace slag (reduction stage)
(Leaching test according to the notification of the Environment Agency)

It can be understood from the result shown in Table 7 that the noxious metals which were contained in the dust and sludge are almost completely set in the modified slag. Consequently, the finally obtained slag can be satisfactorily used as a material for civil engineering works.

Figure 2:
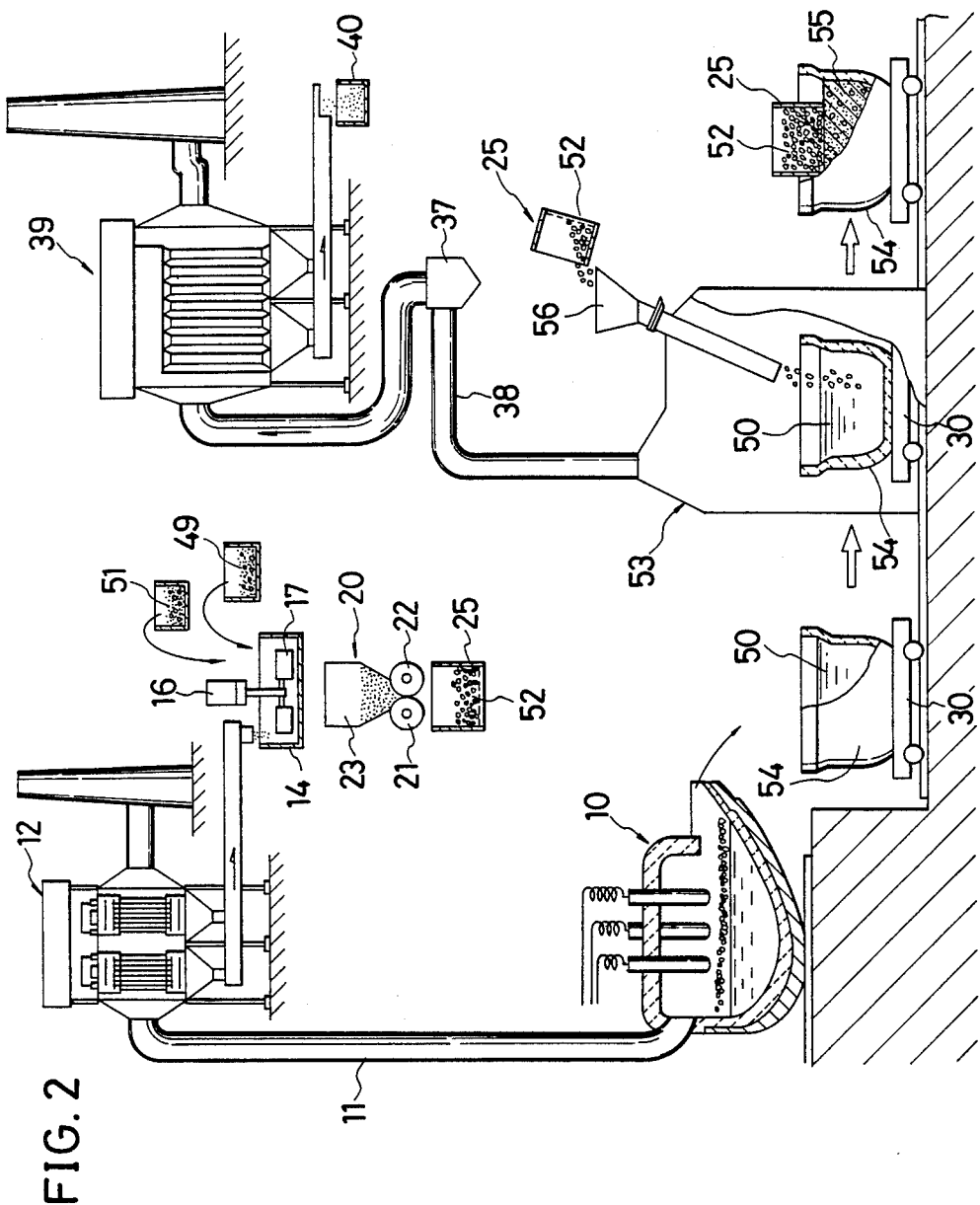
FIG. 2 is a flow chart showing a representative example of the process for simultaneously treating dust, sludge and steel slag according to the second invention.

In the above example shown by any of the FIGS. 1 and 2, it is possible to carry out bubbling with a lance pipe to such an extent as not to lower the temperature of the molten steel slag with a view to accelerating the stirring of molten steel slag.

What is claimed is:

1. A process for the simultaneous treatment of dust, sludge and steel slag which comprises the first step of adding 5 to 20% by weight of a reducing agent to dust and sludge generated in the steel-manufacturing step, followed by kneading, the second step of converting the mixture kneaded in the first step into a lump having a particle size of 5 to 80 mm with a lumping device, the third step of adding the lump prepared in the second step and 5 to 20% by weight, based on the amount of the molten steel slag to be treated, of a silicate mineral containing water of crystallization to the molten steel slag to carry out the modification of the slag with bubbling due to the decomposition of the silicate mineral containing water of crystallization, and the fourth step of cooling the steel slag treated in the third step to recover a metal component by an ordinary mineral dressing method.

2. A process for the simultaneous treatment of dust, sludge and steel slag as set forth in claim 1, wherein the lump prepared in the second step and the silicate mineral containing water of crystallization are preheated and added to the molten steel slag in the third step.

3. A process for the simultaneous treatment of dust, sludge and steel slag as set forth in claim 1, wherein said silicate mineral containing water of crystallization is obsidian, perlite, pitch stone or a mixture thereof.

4. A process for the simultaneous treatment of dust, sludge and steel slag as set forth in claim 1, wherein the Pb and Zn evaporated by adding the lump to the molten steel slag in the third step are recovered with a collector of filtration type.

5. A process for the simultaneous treatment of dust, sludge and steel slag as set forth in claim 1, wherein the amount of the lump comprising dust, sludge and a reducing agent and prepared in the second step to be added in the third step is at most 20% by weight based on the molten steel slag to be treated.

6. A process for the simultaneous treatment of dust, sludge and steel slag, which comprises the first step of adding 5 to 20% by weight of a reducing agent and 5 to 20% by weight, based on the molten steel slag to be treated, of a silicate mineral containing water of crystallization to dust and sludge generated in the steel-manufacturing step, followed by kneading, the second step of converting the mixture kneaded in the first step into a lump having a particle size of 5 to 80 mm with a lumping device, the third step of adding the lump prepared in the second step to the molten steel slag to carry out the modification of the slag with bubbling due to the decomposition of the silicate mineral containing water of crystallization, and the fourth step of cooling the steel slag treated in the third step to recover metals by an ordinary mineral dressing method.

7. A process for the simultaneous treatment of dust, sludge and steel slag as set forth in claim 6, wherein the lump prepared in the second step is preheated and added to the molten steel slag in the third step.

8. A process for the simultaneous treatment of dust, sludge and steel slag as set forth in claim 6, wherein said silicate mineral containing water of crystallization is obsidian, perlite, pitch stone or a mixture thereof.

9. A process for the simultaneous treatment of dust, sludge and steel slag as set forth in claim 6, wherein the Pb and Zn evaporated by adding the lump to the molten steel slag in the third step are recovered with a collector of filtration type.

10. A process for the simultaneous treatment of dust, sludge and steel slag as set forth in claim 6, wherein the amount of the lump comprising dust, sludge, a reducing agent and a silicate mineral containing water of crystallization and prepared in the second step to be added in the third step is at most 20% by weight based on the molten steel slag to be treated.

* * * * *